Figure 1:
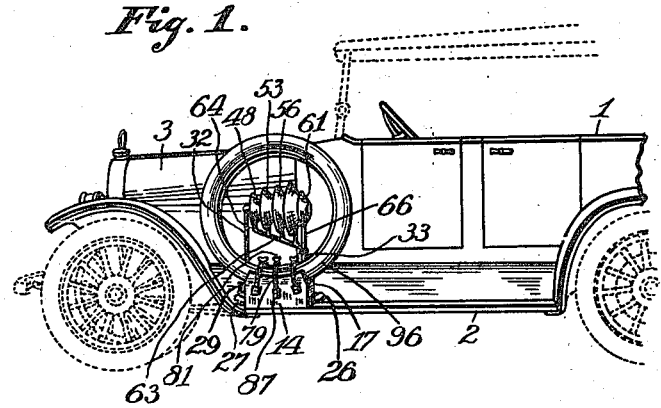

Mar. 13, 1923.

M. C. BRIGHT ET AL 1,448,481

TRAVELING TIRE VULCANIZING SYSTEM

Filed Apr. 14, 1922

3 sheets-sheet 1

INVENTORS:
M. C. Bright, J. M. Brautigam,
By E. T. Silvius,
ATTORNEY.

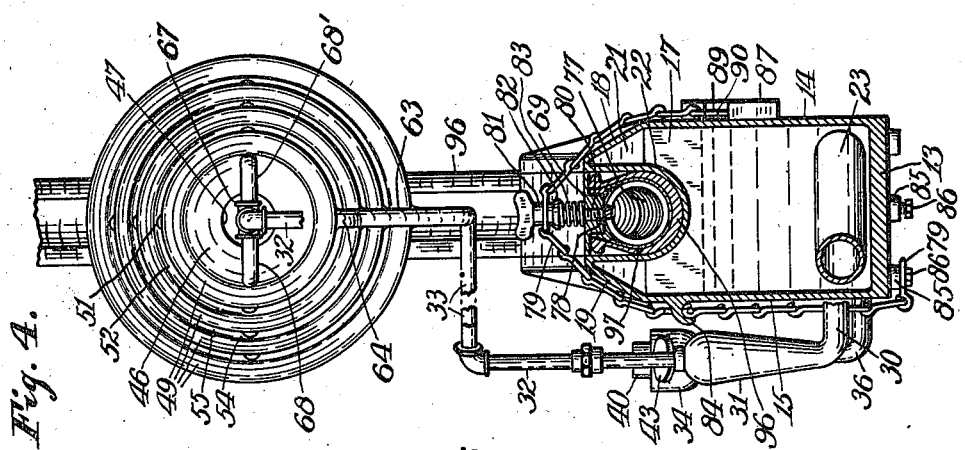
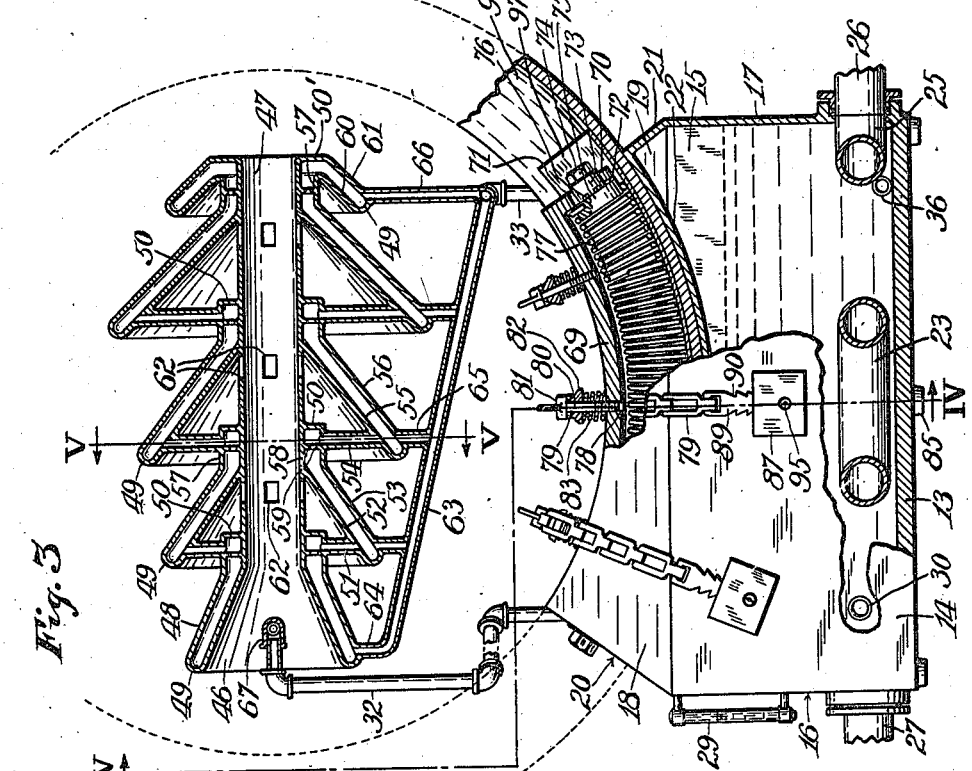

Mar. 13, 1923.
M. C. BRIGHT ET AL
TRAVELING TIRE VULCANIZING SYSTEM
Filed Apr. 14, 1922
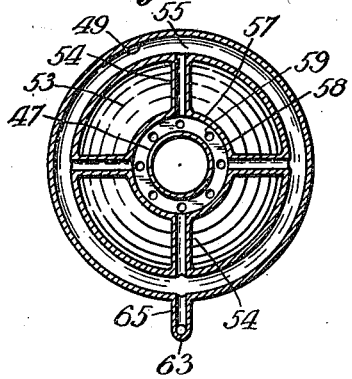
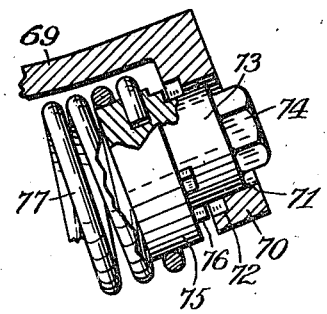
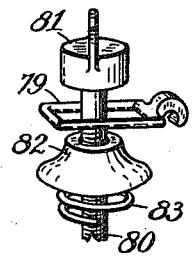
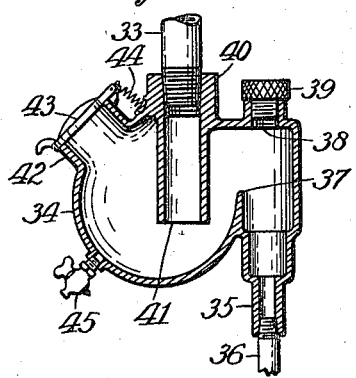
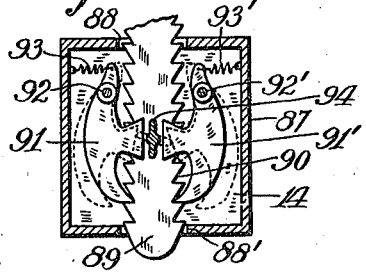
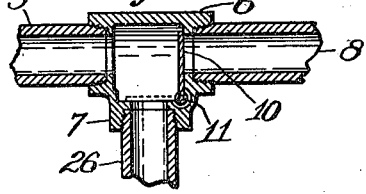
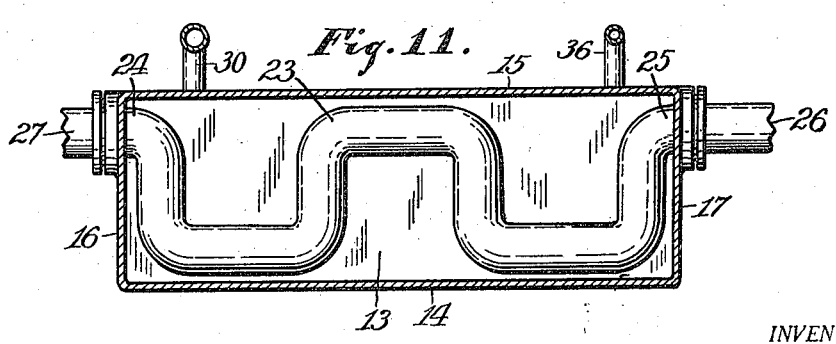
INVENTORS:
M. C. Bright, J. M. Brautigam,
By E. T. Silvius,
ATTORNEY.

Patented Mar. 13, 1923.

1,448,481

UNITED STATES PATENT OFFICE.

MARTIN C. BRIGHT AND JOHN M. BRAUTIGAM, OF INDIANAPOLIS, INDIANA.

TRAVELING TIRE-VULCANIZING SYSTEM.

Application filed April 14, 1922. Serial No. 552,507.

*To all whom it may concern:*

Be it known that we, MARTIN C. BRIGHT and JOHN M. BRAUTIGAM, citizens of the United States, residing at Indianapolis, in the county of Marion and State of Indiana, have invented a new and useful Traveling Tire-Vulcanizing System, of which the following is a specification, reference being had to the accompanying drawings and to the letters and figures of reference marked thereon.

This invention relates to a system that is designed principally for the advantage of the automobile tourist to enable him to repair damaged pneumatic tires or tire casings without loss of the time and cost involved in tire repairs at established repair shops, the invention having reference more particularly to vulcanizing apparatus that is designed to be used economically in the consumption of water for heat and by utilizing exhaust gases from explosion engines for heating the water advantageously used in vulcanizing operations.

An object of the invention is to provide a traveling tire-vulcanizing apparatus which shall be of such construction as to be economical in the use of water, and therefore be time saving in maintaining the proper supply of the water to be used for vulcanizing purposes.

Another object it to provide a traveling tire-vulcanizing apparatus which shall be so constructed as to be capable of utilizing waste heat from the explosion engines of automobiles or other motor vehicles, in order to eliminate expense for heat required in vulcanizing operations.

A further object is to provide a traveling tire-vulcanizing apparatus which shall enable automobile tourists to travel with the minimum number of spare tires and to repair damaged tires at a small cost while continuing a journey, which apparatus shall be so constructed as to be capable of carrying a spare tire on a motor vehicle.

A still further object is to provide an improved tire-vulcanizing apparatus which shall be so constructed as to embody various improved features and be capable of being economically operated in a repair shop with the use of waste heat from explosion engines, and which shall be reliable, durable and economical in use.

With the above-mentioned and other objects in view, the invention consists in vulcanizing apparatus combined with a motor vehicle and the explosion engine thereof, whereby the apparatus is conveniently provided with a traveling support by means of which forced air currents due to the movement of the support are made available for preventing loss of the water from the apparatus due to excessively heated water, the combination of the apparatus with the explosion engine making the exhaust gases available for heating the water in the apparatus, and the invention consists also further in the novel parts, and in the combinations and arrangements of parts, as hereinafter particularly described and further defined in the accompanying claims.

Figure 2:
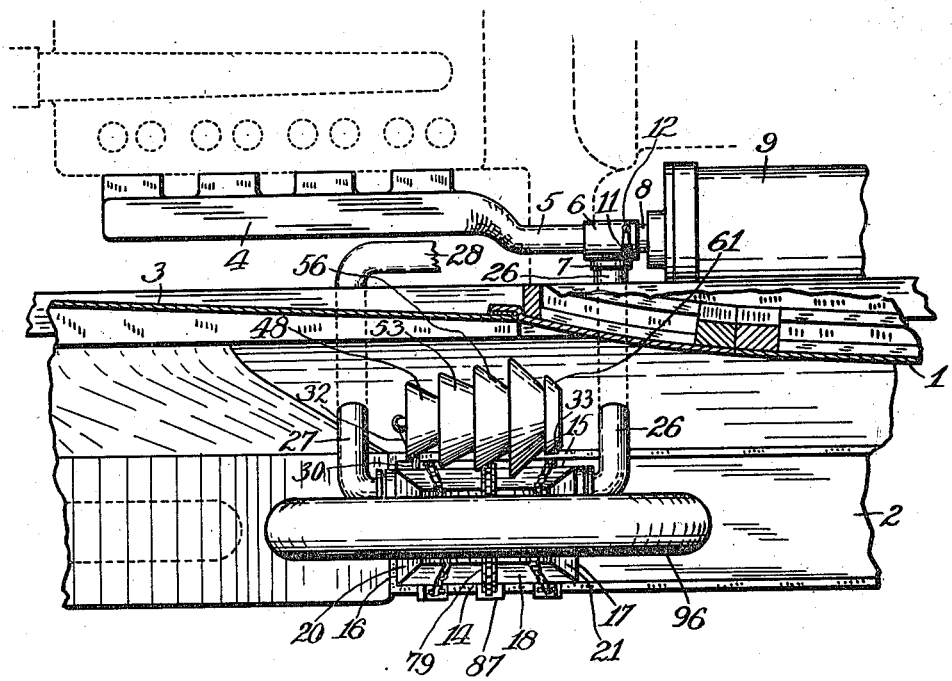

Referring to drawings, Figure 1 is a fragmentary perspective view of the invention as preferably constructed and arranged, as in connection with a motor vehicle of the touring car type; Fig. 2 is a fragmentary top plan of the apparatus in connection with the vehicle, on an enlarged scale; Fig. 3 is a central longitudinal section of the apparatus, partially in front elevation, on a further enlarged scale; Fig. 4 is a transverse sectional elevation approximately on the line IV—IV in Fig. 3; Fig. 5 is a transverse section approximately on the line V—V in Fig. 3; Fig. 6 is a fragmentary sectional detail reproducing a portion of Fig. 3 on an enlarged scale; Fig. 7 is a perspective view of a number of associated parts of the vulcanizing attachments on an enlarged scale; Fig. 8 is a sectional elevation showing locking devices relating to the vulcanizing apparatus on an enlarged scale; Fig. 9 is a vertical central section of a combination device associated with the vulcanizing apparatus, being on an enlarged scale; Fig. 10 is a sectional detail illustrating a valve on an enlarged scale whereby to control the heating of water in the boiler portion of the vulcanizing apparatus; and, Fig. 11 is a horizontal section of the boiler portion of the apparatus showing means whereby to apply heat from the exhaust gases from the engine to heat the water required.

Similar reference characters in the different figures of the drawings indicate corresponding elements or features of construction herein referred to in detail.

As an illustration of the general characteristics of the invention and one of the principal objects thereof, it is shown in connection with a touring car having a familiar type of body 1, running board 2, engine hood 3 covering an explosion engine, partially outlined by broken lines in Fig. 2, which has the conventional exhaust manifold 4 to the end of which an exhaust pipe 5 is connected. For the purpose of the present invention a valve body 6 is connected with the exhaust pipe and has a lateral branch 7, and preferably an exhaust pipe extension 8 is connected with the body and with a suitable muffler 9. A suitable valve 10 is movably arranged in the valve body, being preferably secured to a shaft 11 rotatively arranged in the body to permit the valve to close either the branch 7 or the extension 8, the shaft extending through the body and being provided with an operating arm 12 whereby the valve may be adjusted so as to direct all or any desired portion of the flow of exhaust gases into the branch 7.

The structure of the vulcanizing apparatus includes a mold which has a boiler portion comprising a bottom 13, vertical sides 14 and 15 and vertical ends 16 and 17, the sides having upper portions 18 and 19 respectively that extend upwardly and convergently each towards the other to constitute top portions of the mold structure, the ends having upper portions 20 and 21, that extend upward convergently each towards the other to constitute top portions of the top structure, the remaining portion of the top being composed of a curved mold 22 depending from the upper extremities of the convergent portions. The mold has an open top to receive portions of a tire or a tire casing. A suitable pipe coil 23 of large capacity is arranged adjacent to the bottom 13 of the water chamber in the boiler portion and it has end portions 24 and 25 that are tightly set in the ends 16 and 17 respectively. The boiler portion of the mold is suitably located on the running board 2, and a heater pipe 26 is connected with the branch 7 of the valve body 6 and also with the end portion 25 of the heater coil. An outlet pipe 27 is connected with the end portion 24 and may be extended to any suitable point, preferably having an extension 28 leading rearward under the vehicle body, and to a muffler if desired. The boiler portion of the mold preferably is provided with a water-gauge 29. An outlet pipe 30 is arranged in connection with the water space in the boiler, being connected preferably to the rear side 15 thereof at a suitable distance above the bottom 13, and it preferably has an expansion dome 31 thereon to which a circulating pipe 32 is connected, the latter leading to a suitable condenser, a preferred form of which will be hereinafter described. A return pipe 33 is arranged to receive water from the condenser and is connected with the top of a hollow body 34 which has several functions, the body having an outlet neck 35 to which a pipe 36 is connected that extends to the lower portion of the water-chamber adjacent to the bottom 13 to conduct the water of condensation to the water-chamber. The body 34 has a barrier wall 37 extending upwards therein to provide an outlet-chamber above the neck 35, and preferably the top of the body 34 has an opening 38 therein above the neck which is provided with a cap or plug 39, permitting water to be supplied to the boiler through the opening 38. Preferably the body 34 has a boss 40 on its top to which the pipe 33 is directly connected, and a trap tube 41 is fixed to the pipe top to constitute an extension of the pipe terminating in proximity to the bottom of the body 34. The upper portion of the body 34 has a large neck 42 thereon which is inclined and its top provided with a hinged valve 43 adapted to close by the force of gravity, but preferably is provided with a spring 44 to assist in closing the valve and to resist steam pressure in the boiler, the valve being adapted to be automatically opened as a safety valve to relieve over-pressure of steam. Preferably the lower portion of the body 34 has a drain valve 45 connected thereto.

The preferred form of condenser comprised in the system is designed to operate most efficiently when carried forward through the atmosphere, and it comprises a series of chambers adapted for rapidly condensing steam or vapor, one of the chambers having a funnel-shape inner wall 46 that is connected to a tube 47 which constitutes an element on which the condenser chambers are grouped. The forward chamber has an outer wall 48 extending about the inner wall 46, and a front wall 49 connected to the inner and outer walls, the chamber having a rear end 50. The smaller portion of the chamber has lateral ducts 51 connected therewith. A diametrically larger condenser chamber is arranged rearward of the front chamber and comprises an inner wall 52 connected to the tube 47, and an outer wall 53, the inner and outer walls being provided with ends 49 and 50. The larger end of the wall 52 extends about the smaller end of the forward chamber and is connected with the ducts 51. The second chamber is provided at its smaller end with radial ducts 54 that are relatively longer than the ducts 51. A third condenser chamber comprises an inner wall 55 that is diametrically larger than the outer wall 53 of the second chamber and its larger end is connected with the ducts 54, its smaller end being connected to the tube 47, and the third chamber has an outer wall 56 together with the ends 49 and 50. Any suitable number of the condenser chambers may be likewise constructed and arranged. Preferably the smaller end of each condenser chamber has a cylindrical outer neck wall 57 to which the ends 50 and the radial ducts are directly connected, there preferably being a partition 58 in the chamber that has apertures 59 therein. A terminal condenser chamber comprises an inner wall 60 and an outer wall 61 extending from an end wall 50' that is connected to the end of the tube 47, the inner wall 60 being connected to the cylindrical wall 57 of the next adjacent chamber, the terminal chamber having the end 49. The tube 47 has apertures 62 in the wall thereof adjacent to the smaller end of the inner walls 52 and 55 for the escape of the atmospheric air that may be forced against the inner walls of the several condenser chambers. The condenser is suitably arranged on the vehicle, the tube 47 being horizontal and the larger end of the front chamber foremost, and a collecting-pipe 63 is arranged below the chambers and has intake pipes 64, 65, 66, connected therewith and extending upward and being connected with the lower portions of the several chambers of the condenser, the collecting-pipe being inclined and connected at its lower end with the pipe 33. The pipe 32 is connected with the wall 46, preferably by means of a T fitting 67 and branches 68 and 68', to conduct steam or vapor from the boiler to the front chamber of the condenser.

An improved self-adjusting apparatus is provided whereby to hold a tire casing in place in the mold while being vulcanized during the movements of the vehicle; the apparatus comprising a curved presser bar 69 corresponding in length to the top of the mold, and each end thereof is provided with an outwardly extending abutment 70 having a bore 71 therein and also notches 72 at the inner end of the bore. A cylindrical adjuster head is provided for each abutment and comprises a guide member 73 that is loosely rotatable in the bore and has a head 74 on its outer end adapted to being engaged by a wrench, the guide member having a relatively large flange 75 on its inner end that is provided with ratchet teeth 76 arranged to operate in the notch 72. A coil spring 77 designed to constitute an elastic core has its two opposite ends secured to the flange 75, the spring extending along the convex side of the presser bar 69 to be engaged thereby in operations of the apparatus. The presser bar has a suitable number of screw-threaded holes 78 therein to receive adjusting screws. A band is provided which comprises links 79 connected together as a chain. An adjusting-screw 80 having a head 81 is inserted through one of the links of each of the bands and through a washer 82 and into one of the screw-threaded holes, the head 81 being arranged against the outer side of the link and the washer against the inner side of the link. A coil spring 83 is arranged on each adjusting-screw and seated against the washer and the presser bar, the latter being arranged in the cavity of the mold, permitting one portion of the band to be fastened to the back of the boiler and the opposite portion to the front of the boiler. The back or rear side of the boiler may be provided with suitable hooks or projections 84 to which a link of the chain band may be connected, and also the bottom 13 of the boiler may be provided with bosses 85 having a cap screw 86 therein whereby other links may be secured to the boiler.

The front of the boiler has a suitable number of lock cases 87 fixed thereon, each having a slot 88 in its top and a similar slot 88' in its bottom to receive a ratchet bar 89 having ratchet teeth 90 thereon. A pair of dogs 91 and 91' are connected between their ends to pivots 92 and 92' on opposite sides respectively of the ratchet bar and provided at one end with springs 93 and 93' to yieldingly force the opposite ends of the dogs into engagement with the ratchet teeth, as the ratchet bar is moved downward to clutch it and prevent its withdrawal. The ratchet bar may be released by means of a key 94 inserted through a key hole 95 in the front of the lock case and between the dogs, the key being rotatable and adapted to force the dogs apart and from the ratchet teeth. In the illustration the numeral 96 indicates a pneumatic tire casing arranged in the mold, and 97 indicates a protecting sheath arranged in the tire casing and on which the coil spring core 77 directly bears during vulcanizing operations.

In practical use the article requiring repairs by vulcanizing is prepared to be vulcanized in a well known manner and placed in the mold cavity. The core spring is placed upon the article, after which the heads 74 may be turned in the proper direction to effect a change of diameter of the spring 77 if desired. The adjusting-screws 81 are properly turned to cause the springs 83 to be compressed and clamped between the washer 82 and the presser bar. The slack at one end of the chain band is taken up and the end secured to the boiler portion of the mold, after which the ratchet bar 89 is pushed into the lock casing until the slack is taken up and the band secured by means of the locking dogs. The weight of the presser bar and the elastic core now gently holds the work in place, but the work is more securely held in place by means of springs 83 which are permitted to perform their functions by properly turning the adjusting-screws 80 to permit the springs to exert proper pressure against the band and the presser bar, the pressure on the patch required to be made being of an elastic character unlike that produced by a direct screw pressure commonly employed which tends to cause uneven thickness of material at the patch. The adjusting screws may be readily manipulated to vary the pressure of the springs 83 to obtain the most satisfactory results. Having prepared for vulcanizing operations, and the boiler being supplied with water, the explosion engine or motor may be started, and also the vehicle may be started on a journey. The valve 10 is properly adjusted to direct the hot exhaust gases into the coil in the boiler, resulting in the water becoming heated to the desired temperature for vulcanizing purposes, vapor or steam rising from the water and heating the mold. Although the valve 10 may be readjusted according to good judgment, the water may become unnecessarily hot but this is checked and automatically regulated, the high temperature steam causing sufficient pressure to force some of the hotter water out through the pipe 30 and through the dome 31 in which the water has a tendency to rapidly expand into vapor or steam and then pass through the pipe 32 and into the front chamber of the condenser. As the vehicle moves forward the atmospheric air is forced through the tube 47 and also is forced by the funnel-shape chambers into the tube, causing the steam or vapor in the condenser chambers to become condensed, the water of condensation being collected from the series of chambers and conducted back through the pipe 33 and finally through the pipe 36 to the lower portion of the boiler, thus saving water which might otherwise be lost through escape of steam due to over-pressure. In case of a dangerous degree of over-pressure, the safety valve 43 is automatically lifted and permits release of over-pressure. After having subjected the work sufficiently to the action of the heat to obtain the desired results, the valve 10 may be adjusted to close the branch 7 and cut off the heat from the boiler. After having vulcanized a tire casing, the casing may be carried conveniently in the mold until needed to replace a damaged tire on a wheel. In case the motor vehicle is at rest the explosion engine may be operated at sufficient speed to afford such heat as may be desired to vulcanize an article, as occasion may require.

It should be understood that the vulcanizing apparatus may be stationarily located in a shop or elsewhere in connection with an explosion engine and that a draft through the condenser may be artificially produced to assist in regulating the heat under the vulcanizing mold.

Having thus described the invention, what is claimed as new is:—

1. A vulcanizing system including a boiler with a mold in the top thereof, and a condenser arranged on a higher level than the boiler and adjacent to one side thereof, the condenser having connection with the boiler.

2. A vulcanizing system including a boiler with a mold in the top thereof, a presser bar arranged in the mold, and bands secured to the boiler and having elastic means arranged between the bands and the presser bar to uniformly press the bar in the mold.

3. A vulcanizing system including a boiler with a mold in the top thereof, a presser bar having an elastic front part, and means co-operating with the boiler and having elastic devices operating on the presser bar to force the elastic front part into the mold.

4. A vulcanizing system including a boiler with a mold in the top thereof, a presser bar having a diametrically-variable elastic front part, and means co-operating with the boiler and having elastic devices operating on the presser bar to force the elastic front part into the mold.

5. A vulcanizing system including a boiler with a mold in the top thereof, a heater coil extending through the lower portion of the boiler to heat water therein, a presser bar to operate in the mold, and a condenser connected with the mold to automatically regulate the heat of the water in the boiler.

6. A traveling tire-vulcanizing system having a steam-heated mold including a boiler portion, an air-cooled condenser having connection with said boiler portion to reduce and regulate the temperature therein, and means for supporting and carrying the mold and the condenser together through the atmospheric air.

7. A vulcanizing system including a boiler with a mold in the top thereof, and an air-cooled condenser connected at one end thereof with the boiler at a distance above the bottom thereof, the condenser being connected at the opposite end thereof with the boiler at a relatively lower level and adjacent to the bottom of the boiler.

8. A vulcanizing system including a boiler with a mold in the top thereof, a heating coil arranged in the lower portion of the boiler, a supply pipe connected with one end of the coil and having a regulating valve therein, and an outlet pipe connected with the opposite end of the coil and extending away from the boiler.

9. A vulcanizing system including a boiler with a mold in the top thereof, a presser bar having an elastic core on its front and arranged in the mold, a plurality of bands extending over the presser bar and adjustably secured to the boiler, and coil springs arranged under adjustable tension between the bands respectively and the presser bar.

10. A vulcanizing system including a boiler with a mold in the top thereof, a presser bar arranged in the mold, bands adjustably secured to the front and rear sides of the boiler and extending across the presser bar, coil springs actively arranged between the bands respectively and the presser bar, and means co-operating with the bands to adjustably restrain action of the springs on the presser bar.

11. A vulcanizing system including a boiler with a mold in the top thereof, a heating coil arranged in the lower portion of the boiler below the mold and having two end portions secured in two opposite end portions of the wall of the boiler, a conduit connected to one of the end portions of the coil to conduct burning fluid to the coil, means to control flow of the fluid through the conduit, and an outlet pipe connected with the opposite end portion of the coil.

12. A traveling tire-vulcanizing system having a steam-heated mold including a boiler portion, a heater coil extending through said boiler portion, a presser bar to operate in the mold, and explosion engine with an exhaust pipe, a conduit connected with the exhaust pipe and one end of the heater coil, an outlet pipe connected with the opposite end of the heater coil, an air-cooled condenser having connection with said boiler portion to automatically reduce and regulate the temperature therein, and means for supporting and carrying the mold and the condenser and also the engine together to cool the condenser in the atmospheric air.

13. A traveling tire-vulcanizing system having a carrier, a mold mounted on the carrier and having a boiler portion to carry water, a heater coil in said boiler portion, means mounted on the carrier for supplying and forcing hot gases to the heater coil to convert the water into vapor, an outlet pipe extending from the heater coil, and an air-cooled condenser mounted on the carrier and having a connection with said boiler portion to conduct hot water from said portion, the connection including a chamber permitting the hot water to expand into vapor and to pass into the condenser, the condenser having also a connection with said boiler portion to conduct the water of condensation to the boiler portion.

14. In a traveling tire-vulcanizing system, the combination with a movable vehicle and an explosion engine thereon, of a boiler with a mold in the top thereof, and a presser bar to operate in the mold, the boiler being mounted on said vehicle and provided with a heater coil having connection with the exhaust portion of said engine, and an outlet pipe connected with said coil.

15. In a traveling tire-vulcanizing system, the combination with a movable vehicle, of a mold having a boiler portion mounted on the vehicle to carry water, the boiler portion being provided with a heater to heat the water, a condenser mounted on the vehicle and having funnel-shape chambers arranged with the larger ends thereof presented forwardly, a collecting-pipe connected with all the chambers, a conduit connected with said boiler portion and also with the forward portion of the condenser, and a pipe connected with said collecting-pipe and also with said boiler portion at the bottom thereof.

16. In a tire-vulcanizing system, the combination with a curved tire mold having a boiler structure, of a curved presser bar arranged in the mold and having abutments on the opposite ends thereof extending towards the bottom of the mold, a coil spring core arranged between the abutments and on the convex side of the presser bar, ratchet devices connected to the ends of the core and co-operative with the abutments to twist the core and vary the diameter thereof, bands adjustably secured to the boiler structure, and means co-operating with the bands to elastically press the pressesr bar into the mold.

17. In a tire-vulcanizing system, the combination of a mold having a boiler portion provided upon its bottom with a heater coil, and a condenser comprising a plurality of funnel-shape chambers arranged with their smaller ends encircled in the larger ends of adjacent chambers, a tube encircled by the smaller ends of the chambers and having apertures in its wall adjacent to the inner wall of the smaller ends of the chambers, ducts connected with the smaller ends of the chambers and the larger ends of the adjacent chambers, a pipe connected with said boiler portion and also with the front one of said chambers, a collecting-pipe arranged below said condenser and having connections with all of said chambers, and a pipe connected with the collecting-pipe and also with said boiler portion.

18. In a tire-vulcanizing system, the combination of a boiler structure having sloping top portions and a curved mold depending from the tops of said sloping portions, the front of said structure having lock cases thereon, each case having slots in the top and bottom thereof, a curved presser bar to operate in the mold and having a core thereon, a plurality of link bands extending across the presser bar and having ratchet bars on one end thereof inserted through the slots in said cases, dogs pivoted in each of said cases and detachably connected with the ratchet bars, means to secure the opposite ends of the bands to the boiler structure, tension springs arranged between the link bands and the presser bar, and adjusting screws extending through the bands and the tension springs and screwed into the presser bar, each adjusting screw having a head engaging the top of the link band.

In testimony whereof, we affix our signatures in presence of two witnesses.

MARTIN C. BRIGHT.
JOHN M. BRAUTIGAM.

Witnesses:
E. T. SILVIUS,
ROBERT LIEBRICH.